Nov. 4, 1952  K. A. COOL ET AL  2,616,778
TAMPERPROOF RECORDER

Filed Sept. 24, 1948  2 SHEETS—SHEET 1

INVENTORS
KENNETH A. COOL AND
BY RALPH W. SLATES

Oberlin & Limbach
ATTORNEYS.

Nov. 4, 1952     K. A. COOL ET AL     2,616,778
TAMPERPROOF RECORDER
Filed Sept. 24, 1948     2 SHEETS—SHEET 2
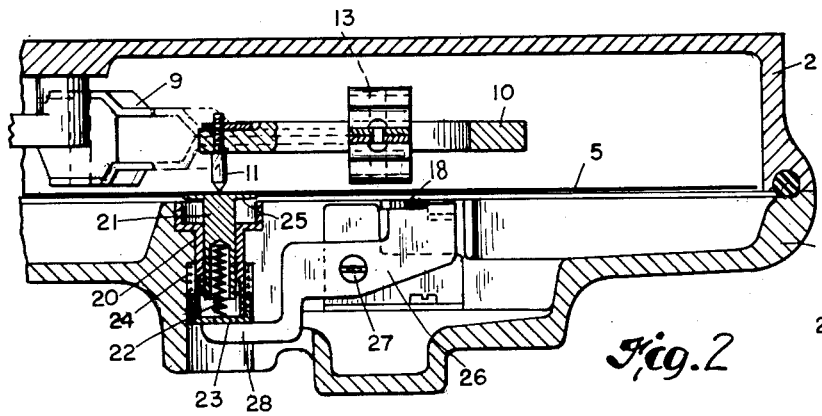
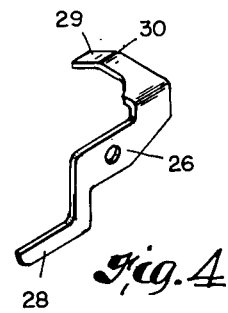
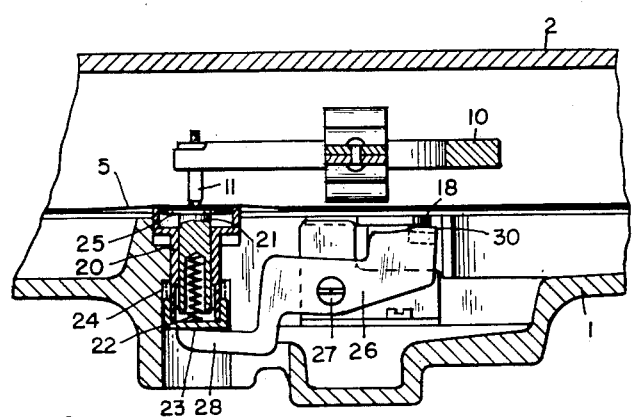
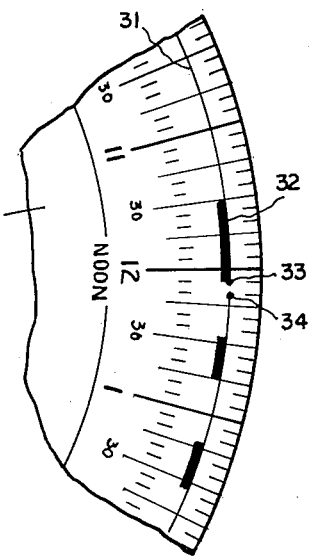
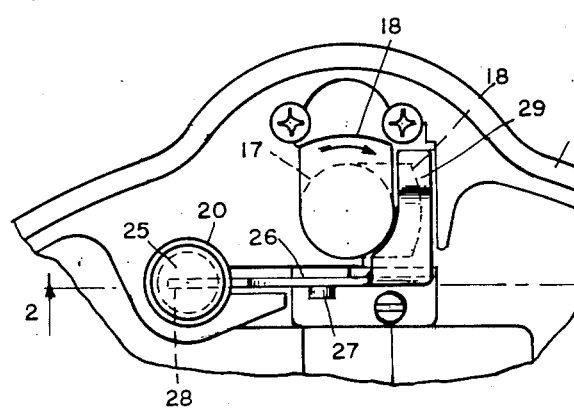
INVENTORS
KENNETH A. COOL AND
BY RALPH W. SLATES
Oberlin & Limbach
ATTORNEYS.

Patented Nov. 4, 1952

2,616,778

UNITED STATES PATENT OFFICE 2,616,778

TAMPERPROOF RECORDER

Kenneth A. Cool, Shaker Heights, and Ralph W. Slates, Lakewood, Ohio, assignors to The Service Recorder Company, Cleveland, Ohio, a corporation of Ohio Application September 24, 1948, Serial No. 51,094

13 Claims. (Cl. 346—59)

1

This invention relates as indicated to recorders and more particularly to a device of the general type illustrated and described in Patent No. 1,865,060 to Henry Rose Cool, for example.

Such recorders are used for a large variety of purposes to show the period of time during which a machine, vehicle or the like is in operation. Truck fleet operators, for example, commonly mount such recording device in the cabs of their trucks so that at the end of each day a record may be obtained showing the time and duration of each period of use of the vehicle. While such device together with the sheet upon which periods of use are automatically recorded is generally enclosed within a locked case or housing to which only supervisory personnel are intended to have access, it has been found in practice that operators frequently obtain keys to the same in order that they may alter and falsify the record therein. It is therefore a primary object of our invention to provide a tamper-proof recorder which will automatically indicate unauthorized opening of such casing or housing.

Another object of our invention is to provide such device which will also indicate the exact time when such casing is opened and closed.

Still another object is to provide such means which will automatically mark the time disc or sheet in a permanent manner not susceptible of eradication.

Another object is to provide means which will thus mark the record sheet whenever the casing is again closed so that it will be impossible to insert a new and falsified record sheet without detection.

Other objects will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is a fragmentary sectional view through the portion of such recorder including such device;

Fig. 3 is a sectional view similar to Fig. 2 but showing the manner of operation of the device when the casing is unlocked;

Fig. 4 is a detail perspective view of the lever

Figure 1:
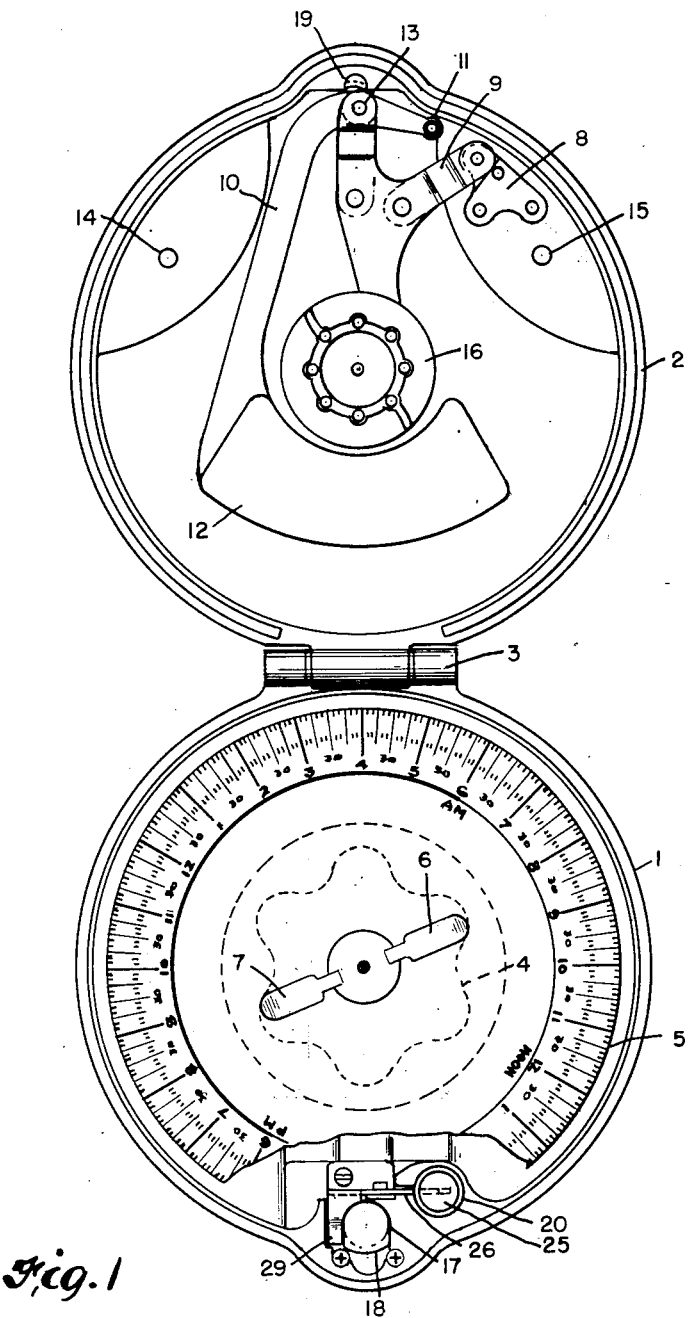
Fig. 1 is a plan view of one preferred form of recorder incorporating our new device.

2 constituting an operating part of such device;

Fig. 5 is a fragmentary plan view of the portion of the recorder including such device;

Fig. 6 is a fragmentary detail view showing the manner in which the locking lug is adapted to engage and rock the lever of Fig. 4; and Fig. 7 shows a portion of a typical time sheet or disc illustrating the form of record left thereon.

Referring now more particularly to said drawing and especially Fig. 1 thereof, a typical preferred form of a recorder there illustrated may comprise a die cast housing or casing consisting of front and back members 1 and 2 respectively, hingedly connected at 3. Such front member contains clock work (not shown) adapted to drive a supporting plate 4 carrying a paper time disc 5 in the manner described in Cool Patent No. 1,980,786, such time disc being held in proper position thereon by means of clamping fingers 6 and 7. The back portion 2 of such housing carries a boss or bracket 8 to which is pivotally attached one arm of a bifurcated member 9 in the other arm of which is pivotally mounted, preferably in needle bearings, an L-shaped lever arm 10 carrying a stylus 11. Such L-shaped arm is provided at its other end with an arcuately shaped weight 12 so balanced as to constitute lever arm 10 a pendulum pivotally supported at 13. Holes 14 and 15 are provided in the back of casing member 2 to permit such casing to be mounted on a vertical support such as the back of a truck cab, for example.

As described in the aforesaid Patent No. 1,980,786, means may also be provided on such housing member for swinging such mounting for the stylus bearing arm 10, such means comprising an actuator 16 adapted to be driven by engagement with clamping fingers 6 and 7 when the casing is closed to shift outwardly a rack (not shown) on the inner end of member 9. In this manner a spiral record will be obtained on the time sheet permitting the same time sheet to be employed for a longer period of time than would be obtained by a single revolution.

In the form illustrated, the well-known Yale lock is employed having a revolving plug 17 carrying a laterally offset lug 18 adapted to engage catch 19 when in the position shown in Fig. 1. When the lock is turned through 90° to the position shown in dotted line in Fig. 5, bolt 18 will be disengaged from catch 19 and the casing may then be opened.

As best shown in Figs. 2, 3, and 5, we mount a sleeve 20 in casing member 1 directly opposite stylus 11 when such casing is in closed position.

A plunger 21 is slidably fitted within such sleeve resiliently backed by a spring 22 which engages the bottom of cup shaped member 23 press fitted on the lower end of sleeve 20. A compression spring 24 engaging the upper lip of cup shaped member 23 tends to hold sleeve 20 retracted within its mounting. The upper end of such sleeve as viewed in Fig. 2 is enlarged to receive the table or anvil 25 which constitutes the end of plunger 21 and resiliently supports time sheet 5 in the area where such sheet is adapted to be engaged by recording stylus 11. This anvil is adapted to support the time sheet slightly above sleeve 20 in normal operation.

A lever 26 which may be in the form of a metal stamping is pivotally mounted at 27 with its lower end 28 engaging the under surface of cup shaped member 23 which as previously indicated is press fitted to sleeve 20. The other end 29 of lever 26 is laterally offset and formed to provide a slight cam hump 30 (Figs. 4 and 6). When lock plug 17 is now rotated to disengage bolt or lug 18 from latch 19, such bolt will override the end 29 of lever 26 as shown in Fig. 3 to elevate the sleeve 20 and time sheet 5 relative to stylus 11, causing such stylus to puncture or permanently mark the sheet.

While the casing is open, the clock mechanism will continue to rotate the time sheet so that when such casing is again closed the stylus will make a new mark in such sheet. Even if the first mark could be obliterated in some manner and the casing re-closed at once before the time sheet could turn appreciably, there would nevertheless be at least one such mark made therein. For the same reason, if the time sheet were removed and a new one substituted, it would similarly have such mark made thereon when the casing is closed.

In a recorder of the type described, the stylus 11 will not oscillate when the machine or vehicle is inoperative and accordingly will merely leave a narrow line 31 on the rotating time disc 5. When however such machine or vehicle is placed in operation, the resultant vibration will cause pendulum 10 to rock through a narrow arc permitted by appropriate stops and a wider band 32 will be marked upon the time disc by the oscillating stylus. When the casing is then opened shortly after noon as shown in Fig. 7, the time disc will be marked or punctured at 33 and again at 34 when the casing is closed. The precise manner in which the time sheet is driven and the stylus mounted and operated is not a part of the present invention and the recorder may for example be electrically driven as described in aplication Serial No. 737,944 of Kenneth A. Cool et al. filed March 28, 1947. We prefer to employ a time sheet comprising a thin cardboard disk which may be colored red and given a thin wax coating. This coating is removed by the stylus to reveal a narrow red line 31 when the vehicle or the like is inactive and a wider solid line 32 when the same is in operation. The stylus point will preferably have an included or vertex angle of about 70° to ensure that it will both describe a proper line on the time sheet and also withdraw readily from the indentation or puncture made when the casing is opened or closed. Of course, a suitable pencil or other appropriate marking instrument may be employed together with an uncoated sheet but the above-described combination is preferred. The ideal vertex angle of the stylus point will vary somewhat depending on the composition and thickness of the time sheet.

Since the indentation or puncture is made by the stylus itself, there is a definite record of the exact times the casing is opened and closed, even where the time sheet makes several revolutions with a resultant spiral track. Broadly, we have provided means whereby the recorder casing cannot be opened or closed without forcing stylus and time sheet together to make a distinctive mark in the latter. In the preferred embodiment illustrated and described herein, the operation of the casing latch serves to move the time sheet toward the stylus insufficiently to indent or puncture the sheet. It is considered desirable to provide a key-operated lock for the casing but this is not necessary to the useful employment of our new invention. In fact, since our new device ensures detection of any tampering, the use of a high quality and expensive lock is no longer of as much importance as formerly.

Other modes of applying the principle of the invention may be employed, change being made as regards the details described, provided the features stated in any of the following claims or the equivalent of such be employed.

We therefore particularly point out and distinctly claim as our invention:

1. In a recorder having a rotatable support for a time record disc and a stylus mounted to trace on such disc as the latter rotates, a casing adapted to enclose such support, disc, and stylus and openable to expose the same, a latch for said casing including a rotatable plug having a lug thereon adapted to engage a catch when said casing is closed, a resiliently backed anvil mounted to underlie such disc opposite said stylus and support the same in normal operation, a sleeve surrounding said anvil axially reciprocable toward and away from such disc and stylus, resilient means tending to hold said sleeve in retracted position, a lever adapted to engage said sleeve to advance the same toward such stylus against the resistance of said resilient means, and a cam surface on said lever engageable by said lug when the latter is turned to unlatched position to rock said lever to advance said sleeve to force such time record disc against such stylus to puncture such disc.

2. In a recorder having a rotatable support for a time record disc and a stylus mounted to trace on such disc as the latter rotates, a casing adapted to enclose such support, disc, and stylus and openable to expose the same, a latch for said casing including a rotatable plug having a lug thereon adapted to engage a catch when said casing is closed, a resiliently backed anvil adapted to underlie such disc opposite such stylus and support the same in normal operation, a sleeve surrounding said anvil axially reciprocable toward and away from such disc and stylus, and a lever adapted to engage said sleeve to thus reciprocate the same, said lever being engageable by said lug when the latter is turned to unlatched position to rock said lever to advance said sleeve to force such time record disc against such stylus to puncture such disc.

3. In a recorder having a rotatable support for a time record disc and a stylus mounted to trace on such disc as the latter rotates, a casing adapted to enclose such support, disc, and stylus and openable to expose the same, a latch for said casing, a resiliently back anvil adapted to underlie and support such disc opposite such stylus in normal operation, a sleeve surrounding said anvil axially reciprocable toward and away from such disc and stylus, a lever adapted to engage said sleeve to reciprocate the same, and means operable by movement of said latch to unlocked position adapted to rock said lever.

4. In a recorder having a rotatable support for a time record disc and a stylus mounted to trace on such disc as the latter rotates, a casing adapted to enclose such support, disc, and stylus and openable to expose the same, a latch for said casing, means adapted to underlie such disc in the general area of such stylus but laterally spaced therefrom, said means being reciprocable to urge such disc toward such stylus, and means responsive to operation of said latch adapted to reciprocate said reciprocable means to force such disc against such stylus to distinctively mark the same.

5. In a recorder, a rotatable support for a record disc, a stylus mounted to trace thereon as such disc rotates, a casing enclosing such record disc, support and stylus, a rotatable latch for said casing having a locking lug, and means engageable by said lug when the latter is turned to unlatched position and operable thereby to force such disc against said stylus with greater than normal recording pressure to produce a distinctive impression therein.

6. In a recorder having a relatively movable record sheet and stylus adapted to trace thereon, a casing adapted to enclose such record sheet and stylus, a rotatable latch for said casing adapted to be turned into and out of latching position, and means adapted to underlie such sheet adjacent such stylus and to move toward and away from such stylus in response to rotation of said latch, whereby such sheet may be forced against such stylus to distinctively indent the same.

7. In a recorder having a relatively movable record sheet and stylus adapted to trace thereon in response to conditions extrinsic of such recorder, a casing adapted to enclose such record sheet and stylus, a latch for said casing, and means responsive to movement of said latch into unlatched position operative to move such sheet toward said stylus to distinctively mark such sheet.

8. In a recorder having a relatively movable record sheet and stylus adapted to trace thereon in response to conditions extrinsic of such recorder, a casing adapted to enclose such record sheet and stylus, a latch for said casing adapted to be moved into and out of latching position, and means responsive to movement of said latch out of latching position operative to move such sheet and stylus more closely together and to return the same to normal relationship upon movement of said latch into latching position.

9. In a recorder having a relatively movable record sheet and stylus adapted to trace thereon in response to conditions extrinsic of such recorder, a casing adapted to enclose such record sheet and stylus, a latch for said casing, and means responsive to actuation of said latch operative to move such sheet and stylus more closely together than in normal operation.

10. In a recorder having a relatively movable record sheet and stylus adapted to trace a line thereon in response to conditions extrinsic of such recorder, separate means mechanically operable to move such sheet and stylus relatively more closely together to make a distinctive mark on such sheet at the synchronous point on such time record line.

11. In a recorder having a rotatable support for a time record disc and a stylus mounted to trace a line on such disc as the latter rotates, said stylus being mounted for oscillation to trace a distinctive mark when energized by conditions extrinsic of such recorder, and separate means mechanically operable to move such disc and stylus relatively toward one another to make a distinctive local mark on such disc at the synchronous point on such time record line.

12. In a recorder having a time record sheet and means operative to trace a time record line thereon pulsating in response to conditions extrinsic of such recorder, means operative when actuated to force said first means to make a local mark on such sheet at the corresponding time point on such same time record line but distinctive from such line itself.

13. In a recorder having a relatively movable time record sheet and stylus mounted to trace on such sheet in response to conditions extrinsic of such recorder, a casing adapted to enclose such sheet and stylus and openable to expose the same, a latch for said casing, means adapted to underlie such sheet in the general area of such stylus but laterally spaced therefrom, said means being reciprocable to urge such sheet toward such stylus, and means responsive to operation of said latch adapted to reciprocate said reciprocable means to force such sheet against such stylus to distinctively mark the same.

KENNETH A. COOL.
RALPH W. SLATES.

REFERENCES CITED

The following references are of record in the file of this patent:

UNITED STATES PATENTS

| Number | Name | Date |
|---|---|---|
| 1,000,147 | Bristol | Aug. 8, 1911 |
| 1,102,266 | Hausburg | July 7, 1914 |
| 1,151,120 | Nieman | Aug. 24, 1915 |
| 1,172,666 | Bruhn | Feb. 22, 1916 |
| 2,051,986 | Cool | Aug. 25, 1936 |
| 2,224,589 | Blum, Jr. | Dec. 10, 1940 |